(12) United States Patent
Stahl (10) Patent No.: US 12,209,676 B2
(45) Date of Patent: Jan. 28, 2025

(54) GAS-CONDUCTING DEVICE HAVING A SAFETY DEVICE (71) Applicant: TRUMA GERAETETECHNIK GMBH & CO. KG, Putzbrunn (DE)

(72) Inventor: Bernhard Stahl, Putzbrunn (DE)

(73) Assignee: TRUMA GERAETETECHNIK GMBH & CO. KG, Putzbrunn (DE)

( * ) Notice: Subject to any disclaimer, the term of this patent is extended or adjusted under 35 U.S.C. 154(b) by 34 days.

(21) Appl. No.: 18/273,838

(22) PCT Filed: Jan. 3, 2022

(86) PCT No.: PCT/EP2022/000002
§ 371 (c)(1),
(2) Date: Jul. 24, 2023

(87) PCT Pub. No.: WO2022/174972
PCT Pub. Date: Aug. 25, 2022

(65) Prior Publication Data
US 2024/0102569 A1    Mar. 28, 2024

(30) Foreign Application Priority Data

Feb. 22, 2021  (DE) .......................... 102021000920.7

(51) Int. Cl.
*F16K 17/36* (2006.01)
*G01P 15/03* (2006.01)
(52) U.S. Cl.
CPC ............ *F16K 17/36* (2013.01); *G01P 15/036* (2013.01)

(58) Field of Classification Search
CPC ............................... F16K 17/36; G01P 15/036
(Continued)

(56) References Cited

U.S. PATENT DOCUMENTS 3,021,856 A * 2/1962 Wilson .................... F16K 24/04
137/43
3,768,497 A * 10/1973 Mueller ................ F16K 17/363
251/213

(Continued)

FOREIGN PATENT DOCUMENTS

DE       3410411 A1    10/1984
EP       2096340 B1     7/2010
(Continued)

*Primary Examiner* — Minh Q Le
(74) *Attorney, Agent, or Firm* — McNees Wallace & Nurick LLC (57) ABSTRACT The present disclosure relates to a gas-conducting device having a safety device for interrupting a gas flow in the device. In a resting state, an inertia body is located on a resting place of a housing bottom so that a plunger rests on it. In an activation state, the inertia body moves out of the resting place, the plunger moves toward the housing bottom, and the safety device interrupts the gas flow. The present disclosure provides in that the housing bottom includes at least one guiding structure and that in the activation state the guiding structure guides the inertia body to a deflection point, in that the guiding structure is designed essentially in the shape of a section of a jacket of a cylinder, and in that a longitudinal axis of the cylinder is offset in relation to a vertical axis which is perpendicular to a center point and/or a lowest point of the resting place.

7 Claims, 6 Drawing Sheets (58) Field of Classification Search
USPC .............................................. 137/38, 39, 45
See application file for complete search history.

(56) References Cited

U.S. PATENT DOCUMENTS

| | | | | |
|---|---|---|---|---|
| 3,805,818 A * | 4/1974 | Yamada | .................. | F16K 17/36 |
| | | | | 137/38 |
| 3,994,359 A * | 11/1976 | Smitley | .................. | B60K 15/01 |
| | | | | 180/282 |
| 3,994,360 A * | 11/1976 | Leibold | .................. | B60K 15/01 |
| | | | | 180/282 |
| 4,007,643 A * | 2/1977 | Matsushita | ............. | F16K 17/36 |
| | | | | 74/2 |
| 4,095,609 A * | 6/1978 | Martin | ............. | B60K 15/03519 |
| | | | | 137/43 |
| 4,185,651 A * | 1/1980 | Paulson | ................ | F16K 17/366 |
| | | | | 200/61.45 R |
| 4,619,417 A | 10/1986 | Teraoka et al. | | |
| 4,735,226 A * | 4/1988 | Szlaga | ............. | B60K 15/03519 |
| | | | | 137/43 |
| 4,742,840 A * | 5/1988 | Takahashi | ............... | F16K 17/36 |
| | | | | 137/43 |
| 4,760,858 A | 8/1988 | Szlaga | | |
| 4,799,505 A * | 1/1989 | Nowell | .................... | F16K 17/36 |
| | | | | 137/38 |
| 4,844,113 A * | 7/1989 | Jones | .................... | F16K 17/363 |
| | | | | 137/460 |
| 4,915,122 A * | 4/1990 | Ikegaya | ................ | F16K 17/363 |
| | | | | 251/74 |
| 4,960,145 A * | 10/1990 | Schlotzhauer | .......... | F16K 17/36 |
| | | | | 180/282 |
| 5,119,841 A * | 6/1992 | McGill | .................... | F16K 17/36 |
| | | | | 74/2 |
| 5,143,110 A * | 9/1992 | Simpson | ................. | F16K 17/36 |
| | | | | 137/38 |
| 5,924,438 A * | 7/1999 | Cimminelli | ............. | F16K 17/04 |
| | | | | 137/39 |
| 6,968,852 B1 * | 11/2005 | Sibley | ................ | F16K 37/0033 |
| | | | | 251/303 |
| 7,918,239 B1 * | 4/2011 | Ikegaya | ................ | F16K 17/363 |
| | | | | 137/556 |
| 8,857,458 B2 * | 10/2014 | Colak | ..................... | F16K 17/36 |
| | | | | 251/74 |
| 8,857,459 B2 * | 10/2014 | Penwell | .................. | F16K 17/36 |
| | | | | 251/74 |
| 2013/0048774 A1 | 2/2013 | Siev et al. | | |

FOREIGN PATENT DOCUMENTS

| | | |
|---|---|---|
| GB | 1314009 A | 4/1973 |
| JP | H09210230 A | 8/1997 |
| JP | H1113915 A | 1/1999 |
| JP | H11255095 A | 9/1999 |
| WO | 2020030398 A1 | 2/2020 |
| WO | 2020030405 A1 | 2/2020 |

* cited by examiner

GAS-CONDUCTING DEVICE HAVING A SAFETY DEVICE

FIELD OF DISCLOSURE

The present disclosure relates to a gas-conducting device having a safety device for interrupting a gas flow in the gas-conducting device.

BACKGROUND

Various devices or valves are known in the prior art which interrupt the passage of a fluid, e.g. a liquid or a gas, in exceptional situations. Inertia bodies are often used here, which are in an unstable equilibrium in the normal state and interrupt the flow of the fluid in the event that a force or acceleration above a predefinable limit value acts on them.

EP 2 096 340 B1 discloses a valve through which a fluid flows and which has a safety device. The safety device has an inertia body, an energy storage device, a movement means and a closure unit. In the normal state, the inertia body prevents the energy storage device from delivering energy to the movement means and thus interrupting the flow of the fluid by means of the closure unit. Should the valve tilt, for instance in the event of an accident, the inertia body will follow the movement and permit the energy storage device to transfer the stored energy to the movement means. The valve further includes a restoring means which allows an operator to restore the closure unit to the open condition.

WO 2020/030405 A1 discloses a safety device in which a plunger rests on the inertia body in the state of rest. When the inertia body moves as a result of an acceleration that exceeds a limit value, the plunger will be lowered and a pivot pin resting on the plunger can rotate. The movement of the pivot pin has an effect on the valve proper, interrupting the flow of the gas through the valve there.

A valve that automatically closes in the event of an earthquake is disclosed in JP H09-210 230 A. Here, an inertia body rests on a plunger. A similar valve that closes in the event of vibration is disclosed in JP H11-13 915 A.

An acceleration sensor with a rolling body located in a receiving element is disclosed in DE 34 10 411 A1. The receiving element is provided with ribs.

SUMMARY

An object of example embodiments includes a gas-conducting device having a safety device, in which a movement of the inertia body after a sharp acceleration is optimized.

The present disclosure achieves the object in that the housing bottom includes at least one guiding structure and in that in the activation state the guiding structure guides the inertia body to a deflection point of the housing bottom, in that the guiding structure is designed essentially in the shape of a section of a jacket of a cylinder, and in that a longitudinal axis of the cylinder is offset in relation to a vertical axis which is perpendicular to a center point and/or a lowest point of the resting place. When, in the activation state, the inertia body leaves the resting place as a result of the action of the force, the inertia body is guided to a deflection point by a guiding structure. In one configuration, the deflection point is located in an area of the housing bottom surrounding the resting place. The geometry of the guiding structure is determined by a cylindrical shape and given by a section of the jacket surface. The longitudinal axis with respect to the orientation relative to the resting place is offset in relation to a vertical axis of the resting place. Depending on the configuration, the vertical axis is perpendicular to the center point and/or to a lowest point of the resting place. The cylinder thus does not extend radially from this central area of the housing bottom.

Here, in one configuration, the inclination of the longitudinal axis of the circular cylindrical cylinder is selected such that an overall increasing slope of the area adjoining the resting place is obtained, but that this slope is less than that of the neighboring areas.

One configuration consists in that the housing bottom has a limited number of deflection points. In this configuration, the housing bottom on which the inertia body is located has a resting place and a limited (or discrete) number of deflection points. In one configuration, four deflection points are provided.

According to a configuration that is attendant on the preceding configuration, each deflection point has a guiding structure assigned to it. In this configuration, in the case of the activation state, the inertia body is guided to a respective deflection point by a plurality of guiding structures.

One configuration consists in that the resting place is located substantially centrally in the housing bottom. In a further configuration, the path from the resting place to each of the deflection points is of the same length.

One configuration provides that the resting place is configured essentially symmetrically about a vertical axis. The vertical axis is perpendicular to the housing bottom here. Insofar as the forces acting—e.g. in the event of an accident or an earthquake—may come from different directions, the symmetry allows the inertia body to react irrespective of the direction of the acting force.

According to one configuration, the resting place is designed to be substantially cone-shaped. In this connection, the cone is arranged in such a way that the inertia body lies in the cone in the state of rest and an angle of ascent is the same in all directions. The design of the inertia body and the dimensioning of the cone can be used to adjust the limit value; when this limit value is exceeded, the inertia body is deflected.

One configuration consists in that the housing bottom has an ascending design adjacent to the resting place and in that the slope of the guiding structure is less than that of sections laterally adjoining the guiding structure. In this configuration, the resting place generally is a valley in which the inertia body is located in its resting state. The resting place is surrounded by the ascending structure of the housing bottom. For one thing, this ensures that the inertia body will not move out of the resting place in response to any action of force, but only when the limit value is exceeded. For another, this geometry allows a simple and generally reliable realization of a reset of the safety device, since the inertia body returns to the resting state due to the earth's gravitational pull. In the activation state, the inertia body thus moves upward in each case from the resting place counter to the gravitational force of the earth. In this context, the area adjacent to the resting place—and in particular surrounding it—is not homogeneous, but has sections having different slopes. The guiding structure differs from the other sections and at least from the sections laterally adjacent to the guiding structure by a lower slope.

In one configuration, at least two diametrically opposed deflection points are provided, each deflection point having a guiding structure assigned to it having the above-mentioned cylindrical shape. The longitudinal axes of the cylinders are each oriented such that there is an offset in relation to the diagonal between the deflection points.

One configuration consists in that the housing bottom has a base area having a plurality of corners, and in that the deflection points are located in the vicinity of the corners. In one configuration, in particular a quadrangular base area is involved. Here, each corner of the base area has a deflection point associated with it. If the resting place is located in the middle of the base area, the corners each comprise the areas farthest from the base area. In this way, in this configuration, the guiding structure guides the inertia body into a respective one of these corners.

One configuration of the gas-conducting device provides that the device is configured as a gas pressure regulator. A pressure regulator is used to reduce a high pressure applied to one side to a lower output pressure.

BRIEF DESCRIPTION OF DRAWINGS

In detail, there is a multitude of possibilities for designing and further developing the gas-conducting device. In this regard, reference is made, on the one hand, to the claims dependent on the independent claim and, on the other hand, to the description below of exemplary embodiments in conjunction with the drawings, in which:

DETAILED DESCRIPTION

Figure 1:
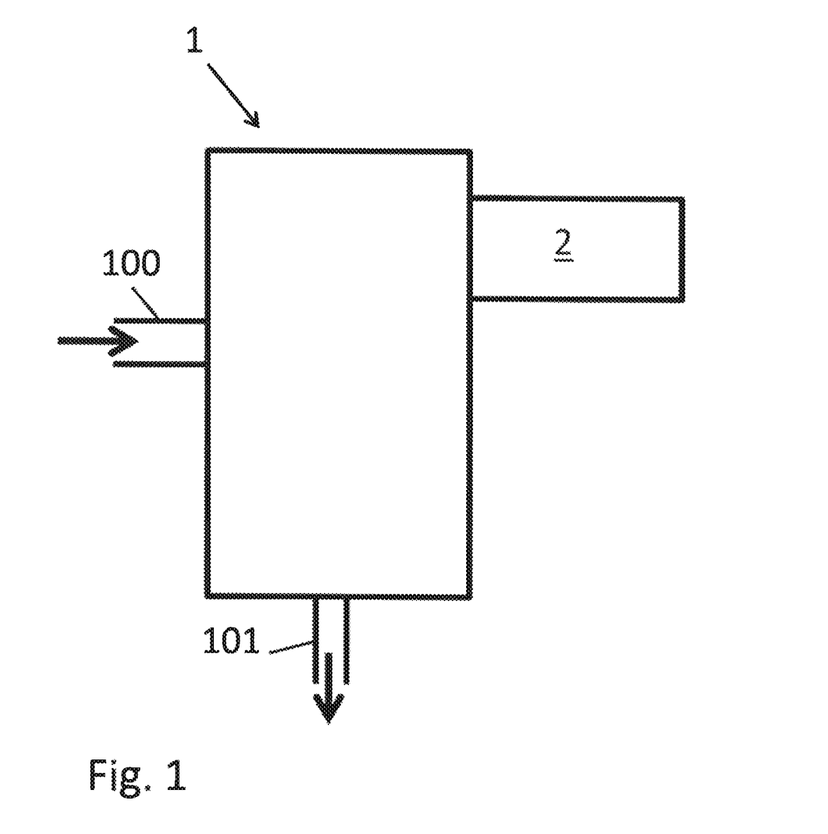
FIG. 1 shows a schematic representation of a gas-conducting device with a safety device.

FIG. 1 schematically shows a gas-conducting device 1 having a gas inlet 100 and a gas outlet 101. This device is, for example, a pressure regulator which reduces the gas pressure applied to the inlet 100. The device 1 is employed, for example, in a caravan or a motorhome. The safety device 2 is provided for the case that the valve 1 is open while driving, so that a heater can be operated, for example, and a vehicle accident occurs in the process. The safety device 2 reacts to an acceleration, such as occurs during an accident, for example, and closes the device 1 so that gas can no longer flow through it.

Figure 2:
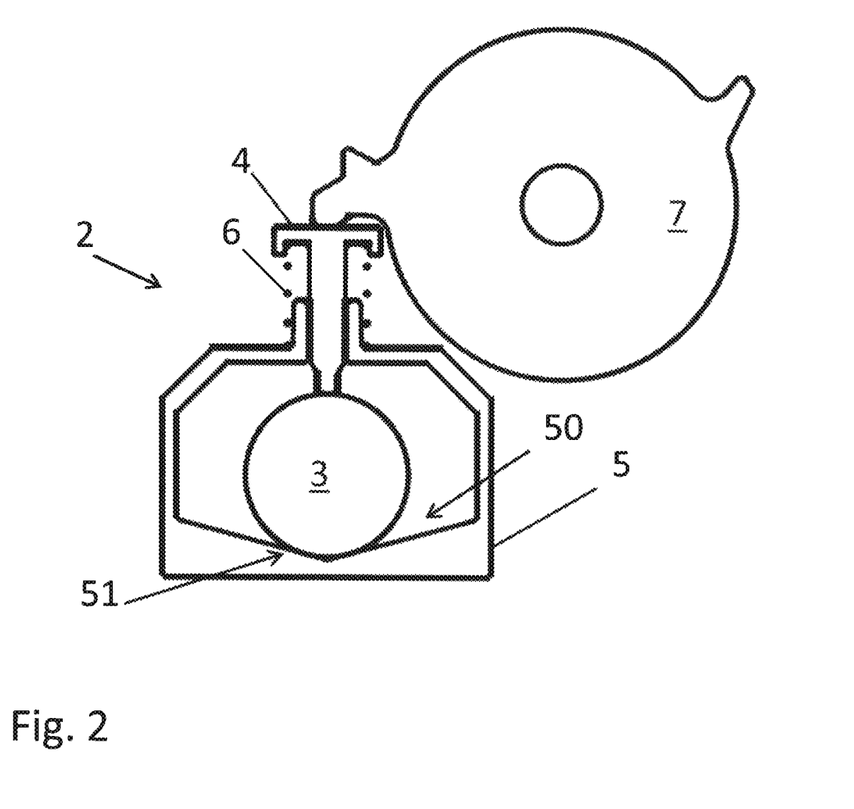
FIG. 2 shows a detail of a configuration of a safety device according to the prior art.

The configuration of the safety device 2 as illustrated in FIG. 2 is described in WO 2020/030405 A1. Shown here is the state of rest or normal state, in which the safety device 2 does not block the gas flow.

An inertia body 3, here in the form of a ball, is located in a housing 5. A plunger 4 rests on the inertia body 3. The plunger 4 is acted upon, on the one hand, by a spring 6 and, on the other hand, by a reaction mechanism 7. The reaction mechanism 7 is connected to a pivot pin not depicted here. The plunger 4 here prevents the reaction mechanism 7 from rotating counterclockwise, as shown in the drawing. Thus, the force of the spring 6 acts upward from below and the reaction mechanism 7 acts from above downward on the plunger 4. The ratios of forces are adjusted such that the force of the reaction mechanism 7 is greater than that of the spring 6. However, this cannot have an effect in the state of rest shown here because the inertia body 3 is located below the plunger 4 and therefore blocks the downward movement of the plunger 4. For this reason, the plunger 4 is also guided in the housing 5.

The inertia body 3 is located on the housing bottom 50 on a resting place 51. The resting place 51 here is below the plunger 4. When an acceleration above a limit value adjustable by means of the components used acts on the inertia body 3, the inertia body 3 moves away from the resting place 51. As a result, the path of the plunger 4 toward the housing bottom 50 or into the housing 5 is no longer blocked and the reaction mechanism 7 can carry out its rotation. This is accompanied by the gas flow in the device as illustrated in FIG. 1 being interrupted.

Figure 3:
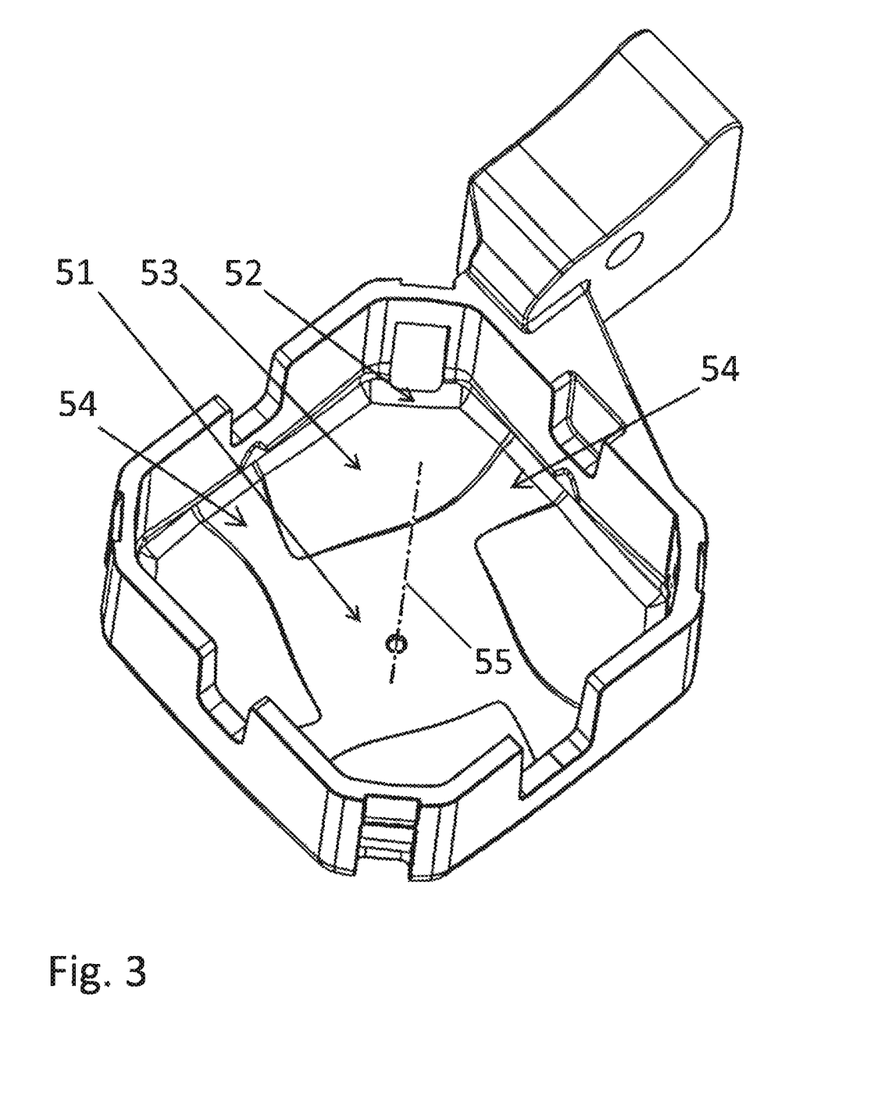
FIG. 3 shows a spatial representation of the housing bottom of a safety device according to an example embodiment.
Figure 4:
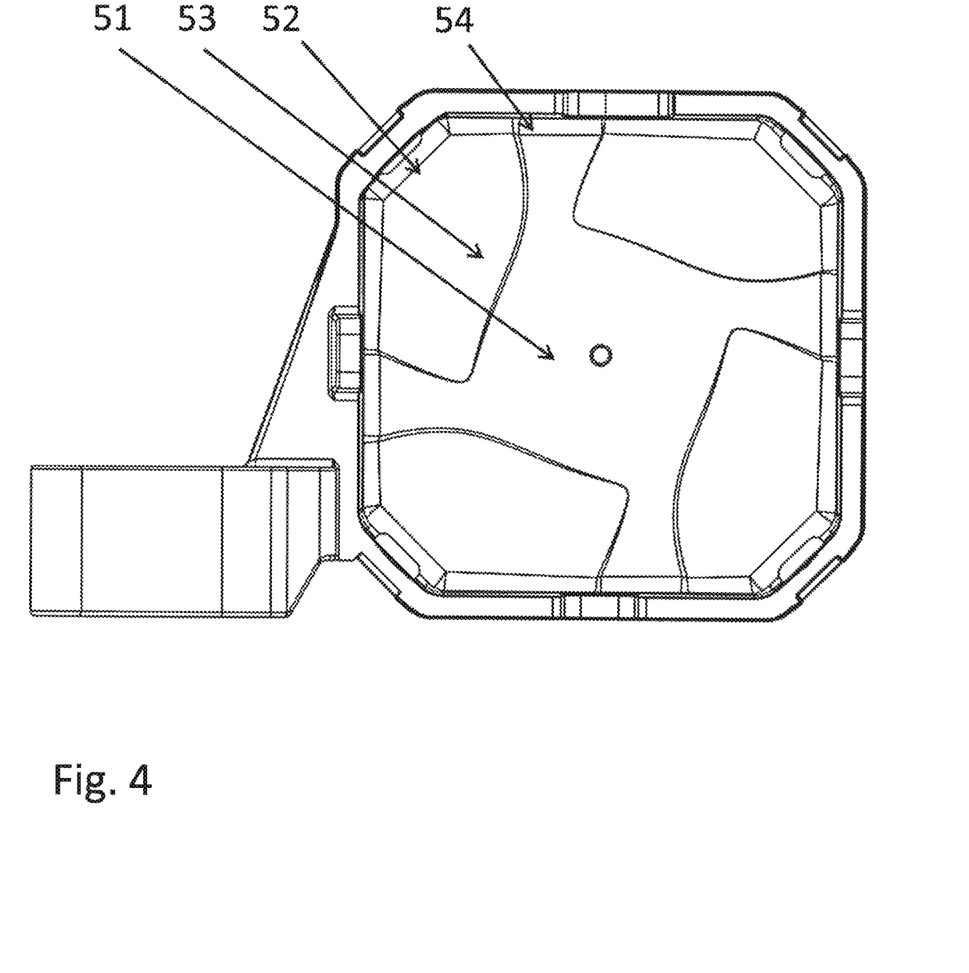
FIG. 4 shows a view of the bottom of FIG. 3.
Figure 5:
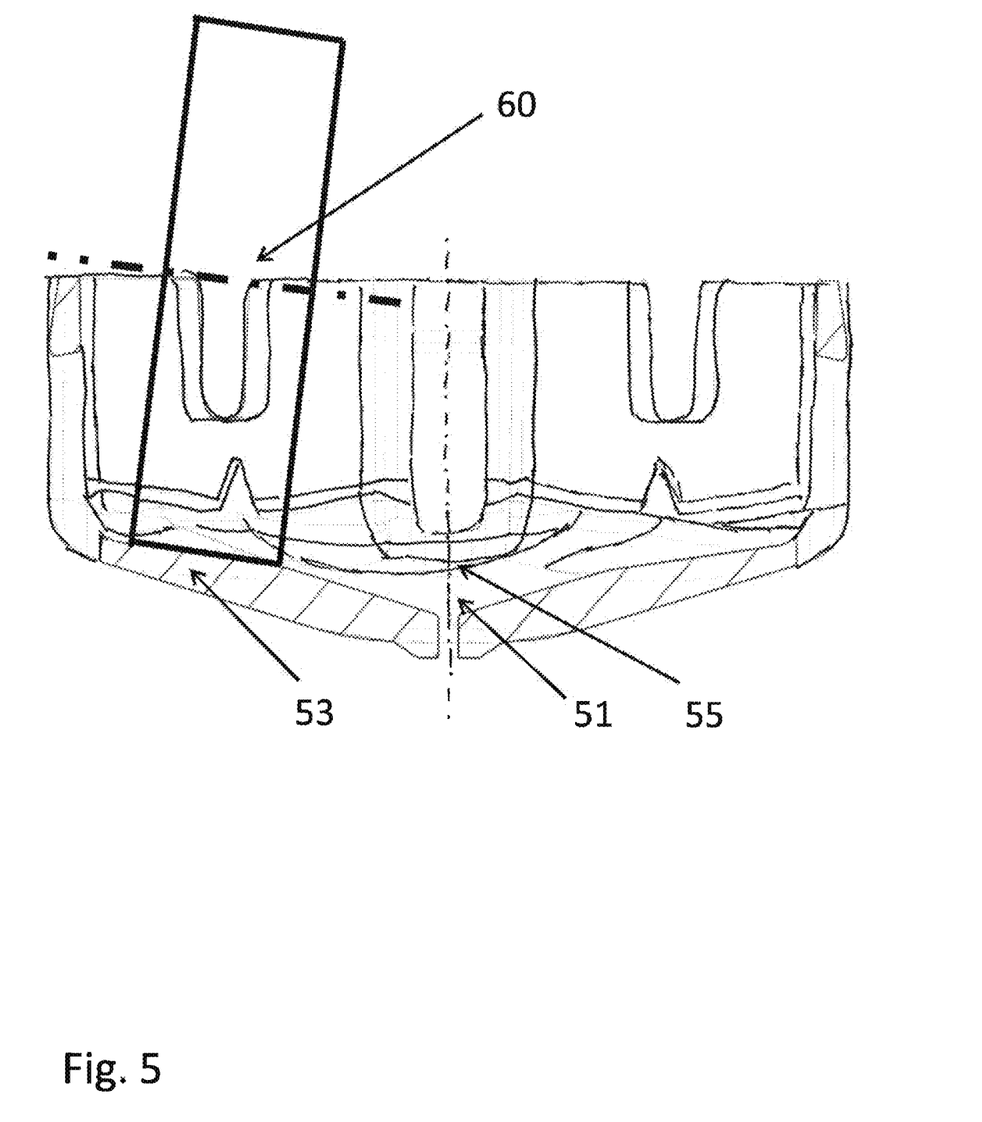
FIG. 5 shows a section taken through the bottom.
Figure 6:
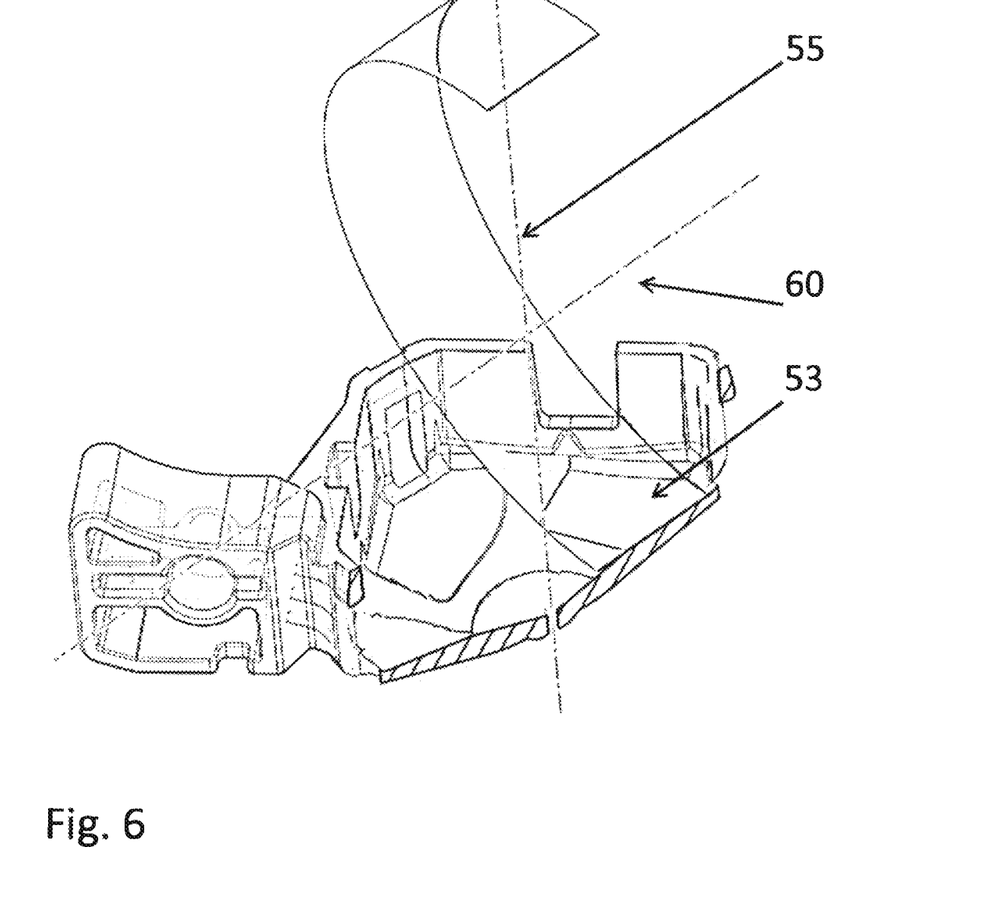
FIG. 6 shows a partially sectioned spatial representation of the housing bottom.

FIG. 3 and FIG. 4 each permit a view into a base part of a housing of a safety device 2 according to an example embodiment. FIG. 5 and FIG. 6 each show portions of the base part, with a cylinder being drawn in which produces the shape of the guiding structure 53. The four illustrations will be discussed together.

The base area of the housing bottom 50 is a quadrangle. There is a deflection point 52 in each of the four corners. The resting place 51, which has a conical shape, is located in the center.

In the activation state, that is when a corresponding force acts, the inertia body (not shown here) will move from the resting place 51 to one of the four deflection points 52. In doing so, the inertia body is guided by the four guiding structures 53, which are adjacent to the resting place 51. In the process, the inertia body 3 moves upward from the resting place 51, which is located at the lowest point in the housing bottom 50.

Located between the four guiding structures 53 are neighboring sections 54. The guiding structures 53 and the neighboring sections 54 have in common that they are each positively ascending. The difference between the guiding structures 53 and the neighboring sections 54 consists in that the guiding structures 53 have a lower slope, so that after leaving the resting place 51 the inertia body tends to roll into the guiding structures 53 and then follows them up to the deflection points 52.

The shape of the deflection points 52 is each given by a section of a jacket of a circular cylinder. FIG. 5 and FIG. 6 each show a cylinder drawn therein that intersects the conical shape of the bottom. The longitudinal axis 60 of the circular cylinder extends past the vertical axis 55, i.e. in particular does not intersect it. The vertical axis 55 here is perpendicular to the center point of the resting place 51, which here is also the lowest point of the housing bottom 50. In FIG. 6, the longitudinal axis 60 is behind the vertical axis 55.

FIG. 5 clearly shows that the guiding structure 53 initially ascends laterally with a first slope given by the conical shape of the bottom, and then rises further outward with a second, smaller slope given by the inclined cylinder jacket surface. It can be seen in particular how the drawn in cylinder results in a bending of the conical shape of the bottom, so that the inertia body is guided toward the deflection point 52. In the configuration shown, the geometry of the guiding structure 53 is obtained by means of the circular cylinder.

LIST OF REFERENCE NUMBERS 1 gas-conducting device
2 safety device
3 inertia body
4 plunger
5 housing 6 spring
7 reaction mechanism
50 housing bottom
51 resting place
52 deflection point
53 guiding structure
54 neighboring section
55 vertical axis
60 longitudinal axis of the cylinder
100 gas inlet
101 gas outlet

The invention claimed is:

1. A gas-conducting device comprising:
a safety device for interrupting a gas flow in the gas-conducting device,
the safety device includes an inertia body, a plunger, and a housing,
wherein the housing includes a housing bottom,
wherein, in a resting state, the inertia body is located on a resting place of the housing bottom, so that the plunger rests on the inertia body,
wherein the inertia body moves out of the resting place in an activation state in the case of an acceleration above a predefinable limit value acting on the inertia body, so that the plunger moves toward the housing bottom and the safety device interrupts the gas flow,
wherein the housing bottom includes at least one guiding structure,
in that in the activation state, the guiding structure guides the inertia body to a deflection point of the housing bottom,
in that the guiding structure is designed in the shape of a section of a jacket of a cylinder, and
in that a longitudinal axis of the cylinder is offset in relation to a vertical axis, which is perpendicular to a center point and/or a lowest point of the resting place.

2. The device according to claim 1,
wherein the housing bottom has a limited number of deflection points, and
wherein each deflection point has a guiding structure assigned to it.

3. The device according to claim 1, wherein the resting place is located centrally in the housing bottom.

4. The device according to claim 1, wherein the resting place is designed to be cone-shaped.

5. The device according to claim 1,
wherein the housing bottom has an ascending design adjacent to the resting place, and
wherein the slope of the guiding structure is less than that of sections laterally adjoining the guiding structure.

6. The device according to claim 2,
wherein the housing bottom has a base area having a plurality of corners, and
wherein the deflection points are located in the vicinity of the corners.

7. The device according to claim 1, wherein the device is configured as a gas pressure regulator.

* * * * *